United States Patent
Tahernezhadi

(10) Patent No.: US 6,813,351 B1
(45) Date of Patent: Nov. 2, 2004

(54) METHOD AND APPARATUS FOR ECHO CANCELLATION THAT SUPPRESSES ECHO LEAK THROUGH

(75) Inventor: Mansour Tahernezhadi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 671 days.

(21) Appl. No.: 09/717,734

(22) Filed: Nov. 21, 2000

(51) Int. Cl.[7] .............................................. H04M 9/08
(52) U.S. Cl. ............................ 379/406.01; 379/406.05; 370/286; 370/289
(58) Field of Search ....................... 379/406.01, 406.05, 379/406.06, 406.08, 392.01, 388.07; 370/286, 289

(56) References Cited

U.S. PATENT DOCUMENTS

| | | | | |
|---|---|---|---|---|
| 5,475,731 A | * | 12/1995 | Rasmusson ..................... | 379/3 |
| 5,563,944 A | * | 10/1996 | Hasegawa .............. | 379/406.04 |
| 5,894,513 A | | 4/1999 | Nasu ..................... | 379/390.01 |
| 6,167,133 A | * | 12/2000 | Caceres et al. ........ | 379/406.13 |
| 6,438,225 B1 | * | 8/2002 | Tahernezhaadi ....... | 379/406.01 |
| 6,597,787 B1 | * | 7/2003 | Lindgren et al. ...... | 379/406.05 |

* cited by examiner

Primary Examiner—Binh Tieu

(57) ABSTRACT

A technique for echo cancellation that suppresses echo leak through includes generating a synthetic echo signal and a center clipper signal from a reference signal, generating an error signal from a desired signal that has been added to a negative of a synthetically generated echo signal; and generating an improved center clipper signal from the center clipper signal, the reference signal, the error signal, and the echo cancelled signal.

16 Claims, 5 Drawing Sheets

FIG. 1 — PRIOR ART —

METHOD AND APPARATUS FOR ECHO CANCELLATION THAT SUPPRESSES ECHO LEAK THROUGH

FIELD OF THE INVENTION

This invention relates in general to echo cancellation, and in particular to the suppression of echo leak through in the output of an echo canceller by improved near end speech pause determination.

BACKGROUND OF THE INVENTION

Echo cancellers are commonly used in full duplex telephony systems to remove undesirable echo signals that would otherwise be included in an output signal. The undesirable echo signal is a far end audio signal that has been modified by a system that introduces either acoustic echo or electric echo and other undesirable inputs, such as background noise. Such telephony systems include telephone handsets operating in an acoustic environment of speaker and microphone coupling, telephone 4 to 2 wire and 2 to 4 wire hybrid audio signal converters, and such systems are generically referred to as echo generating systems. The far end signal, or the echo-generating signal, is alternatively called a reference signal 105.

Referring to FIG. 1, a functional block diagram of a telephony system 100 that incorporates a conventional echo canceller 150 is shown. The echo canceller 150 includes a synthetic echo generator 125 that has a linear adaptive filter that attempts to mimic the echo generating system 110 that is causing the echoing of the reference signal 105. The reference signal 105 is modified by the echo generating system 110, resulting in an undesirable (far end with echo) signal. A near end signal 115 (for example a speech signal from a telephone handset microphone) is added to the undesirable signal, resulting in a near-end-plus-far end echo signal 120 that is also known to those of ordinary skill in the art as the desired signal 120. The reference signal 105 is also coupled to an input of the echo canceller 150 that is coupled to the synthetic echo generator 125. A signal called a synthetic echo signal 126, that is an approximation of the undesirable (echo) signal, is generated from the far end signal by the synthetic echo generator 125 via adaptive filtering. This synthetic echo signal 126 is subtracted by a difference function 127 of the echo canceller 150 from the desired signal 120, generating an echo cancelled version of the desired signal, also known in the art as an error signal 135 (because during times when there is no near end speech, this signal should be at minimum levels). Since this linear operation is not completely effective, for several reasons, residual echo components remain in the echo cancelled error signal 135. One significant reason is that the echo generating system 110 may be non-linear.

An approach to improving the performance of echo cancellation, especially when echo generating consists of a large non-linear component, is to reduce the residual echo components during times when there is no speech input at the near end, because the residual components occurring during these times, called echo leak-throughs, are very noticeable. So, some conventional echo cancellation techniques make a determination of when a pause (or longer cessation) in near end speech occurs, and perform some type of non-linear operation by switching the output so that the output, called herein the leak through output, is either greatly reduced or the output is replaced entirely by internally generated noise known in the art as comfort noise. Comfort noise is used to reduce echo because complete silence on the output is uncomfortable to listeners at the far end.

But because of the non-linear nature of the echo generation system, echo cancellers will sometimes make an incorrect decision as to whether there is a valid pause in the near-end signal. With such an incorrect decision, either a valid echo cancelled near-end signal is mistakenly replaced by comfort noise or the echo-cancelled signal is passed through during a pause in near end audio. Either event results in undesirable signals occurring in the leak-through suppressed signal. This negative aspect of echo cancellation can still be annoying to a far end listener.

In the technique of switching to comfort noise during pauses, the synthetic echo generator 125 makes a determination from the error signal 135 as to when there is a pause or a longer cessation of the reference signal 105, and a control signal 131, is generated and used to select the output 171 of the echo canceller 150 (which is also the output of the telephony system 100) as being either the error signal 135 or an output of a comfort noise source 140 by means of a switch function 170. The control signal 131 is commonly used in conventional echo cancellers and is described herein as a center clipper signal. The center clipper signal 131 is typically generated based on an echo return loss (ERL) parameter derived from the linear adaptive filter, and although the use of the center clipper signal 131 does improve the performance of echo cancellation, in conventional echo cancellers 135 the use of the center clipper signal 131 still allows noticeable echo leak throughs because of non-linear echo generating systems 110, so the output 171 of the echo canceller 150 is called the leak-through output. The technique of attenuating the echo leak through during pauses is described in U.S. Pat. No. 5,894,512, issued to Nasu on Apr. 13, 1999. Nasu's technique operates to attenuate what he calls peripheral noise, which can be echo and/or background noise when the power of the near end signal is less than the power of the reference signal, by attenuating the output signal.

These techniques, while quite effective in many situations, still leave some echo leak through as described above, so what is needed is a more effective echo leak through reduction technique that reduces echo leak through more accurately and completely than available techniques.

DESCRIPTION OF THE PREFERRED EMBODIMENT

Figure 1:
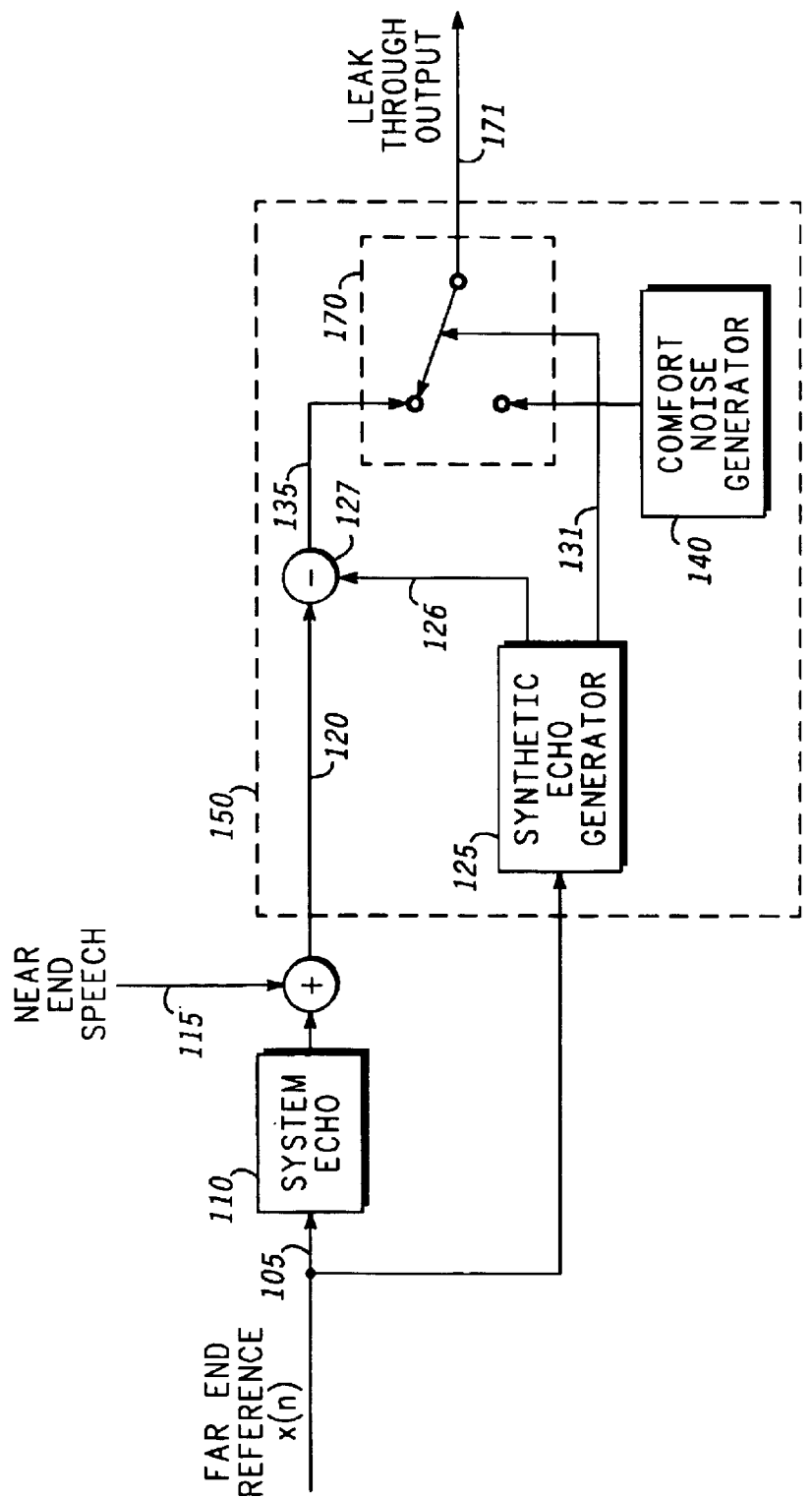
FIG. 1 is a block diagram of a prior art echo suppression system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

Figure 2:
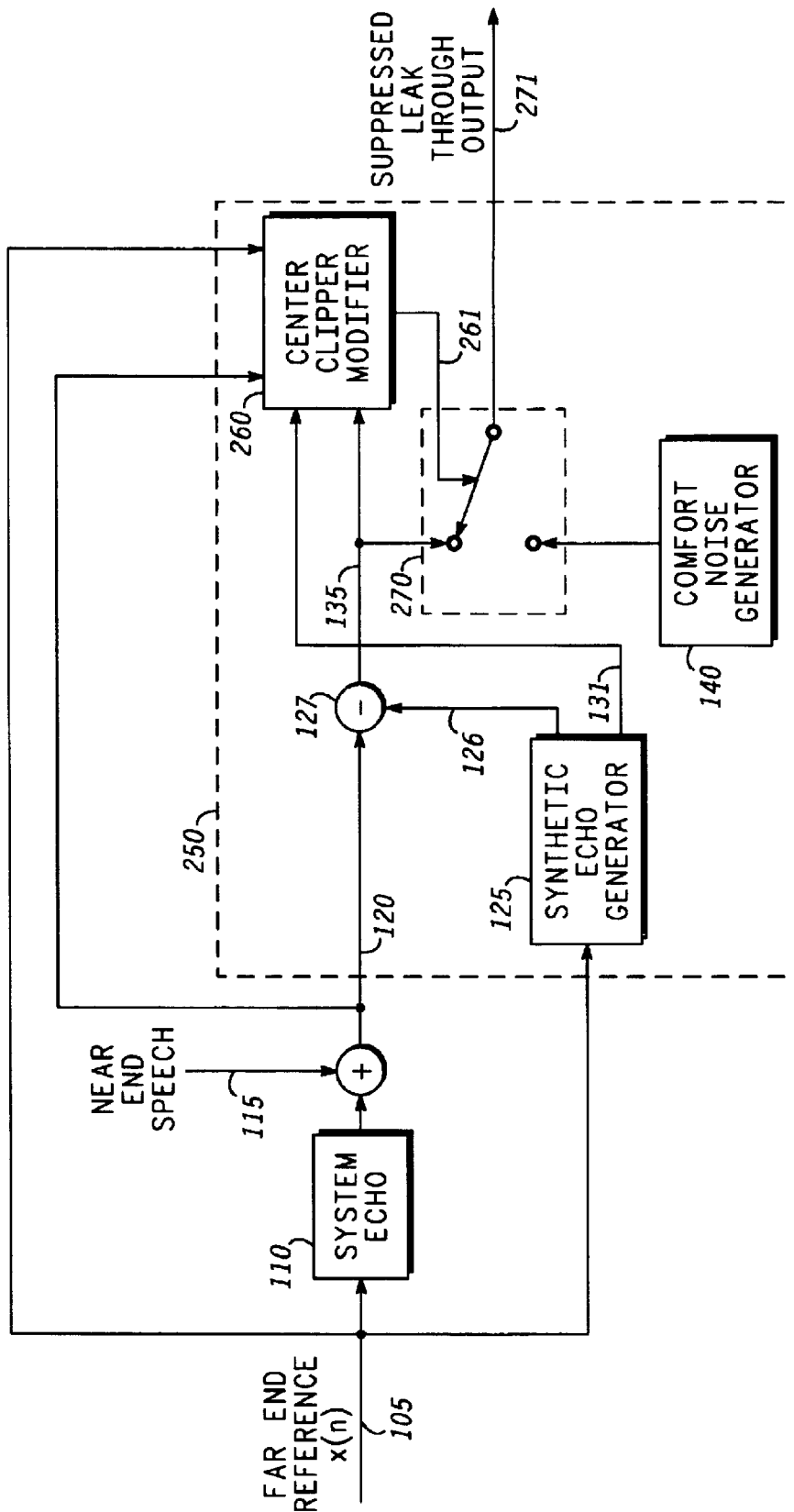
FIG. 2 is an electrical block diagram of an echo suppression system, in accordance with the preferred embodiment of the present invention.

Referring to FIG. 2, an electrical block diagram of a telephony system 200 is shown, in accordance with the preferred embodiment of the present invention. The telephony system 200 is implemented as a state machine that analyzes digital samples of the audio signals at its input to generate digital samples at its output. In accordance with the preferred embodiment of the present invention, the input and output digital sampling occur at a rate of 8 kilosamples per second, and the state machine makes analyzes based on 32 samples that represent 4 milliseconds (msec) of the signals (a state time of 4 msec), but it will be appreciated that the sampling rate and state times could be varied over a wide range and the benefits of this invention would still be realized, although perhaps not as well. As described above with reference to the prior art echo suppression system 100 (see FIG. 1), the reference signal 105 (x(n)) is modified by the echo generating system 110, resulting in an undesirable (far end echo) signal. The near end signal 115 is added to the undesirable (far end echo) signal, generating the desired signal 120 (s(n)) that has an undesired echo in it. The reference signal 105 (x(n)) is also coupled to an input of the echo canceller 250 that is coupled to the synthetic echo generator 125. The synthetic echo signal 126 is generated from the far end signal 105 by the synthetic echo generator 125. This synthetic echo signal 126 is subtracted by the difference function 127 of the echo canceller 250 from the desired signal 120, generating the error signal 135 (e(n)).

Also as described above with reference to FIG. 1, the synthetic echo generator 125 makes a determination as to when there is a pause or a longer cessation of the near-end signal 105, and the center clipper signal 131 is generated in a manner well known in the art. A switch function 270 is used to select the output 271 of the echo canceller 250 (which is also the output of the telephony system 220) as being either the error signal 135 or an output of the comfort noise source 140, but in accordance with the preferred embodiment of the present invention, the switch function 270 of the echo canceller 250 is controlled by an improved center clipper signal 261 generated by a center clipper modifier function 260. Because the use of the improved center clipper signal 261 substantially eliminates echo leakthroughs, the output 271 of the echo canceller 250 is called the suppressed leak through output. The center clipper modifier function 260 determines the improved center clipper signal 261 from present and past states (samples) of the far end reference signal (x(n)) 105, the desired signal (s(n)) 120, and the error signal (e(n)) 135, as described in more detail below.

Figure 3:
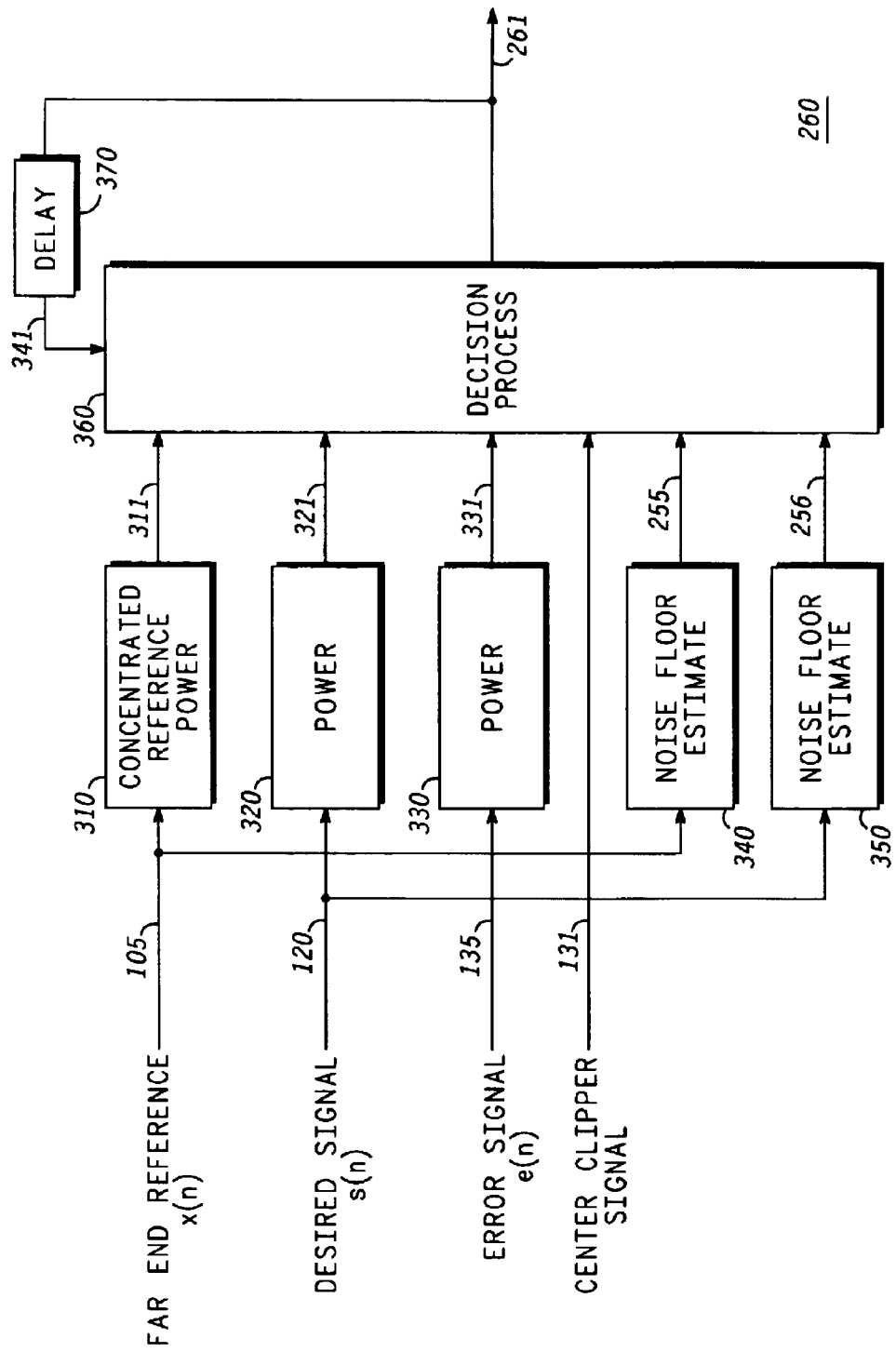
FIG. 3 is an electrical block diagram of center clipper modifier subsystem, in accordance with the preferred embodiment of the present invention.

Referring to FIG. 3, a block diagram of the center clipper modifier function 260 is shown. The center clipper modifier function 260 is a state machine that comprises three power functions 310, 320, 330, two noise floor functions 340, 350, a decision process 360, and a delay function 370. The concentrated reference power function 310 computes a reference signal power value 311, Px(n), every state time by selecting a maximum power near a peak echo delay time. The peak echo delay time is a time prior to the present, or current, state time (n), and is a determined by the synthetic echo generator in a manner well known to one of ordinary skill in the art. The maximum power is selected as the largest of the average powers of four 4 msec reference signal segments aligned with the peak echo delay time, two consecutive segments before and two consecutive segments after the peak echo delay time. The segments are not necessarily aligned with the state time segments. Thus, the power value that is determined by the concentrated reference power function 310 is a measure of the power of the reference signal near the peak echo delay. The power functions 320, 330 each determine average signal power values 321, 331, Ps(n) and Pe(n) respectively, during the current, or present, state time, n, from the samples (32, in this example) of the desired signal 120, s(n), and the error signal 135, e(n), respectively, taken during the current state time. The noise floor functions 340, 350 determine a background noise floor (Bx) 255 of the reference signal 105 and a background noise floor (Bs) 256 of the desired signal 120, respectively, by performing an averaging of power minimums of the signals over a period that is long compared to the state time of the telephony system 200, for example 10 seconds, using techniques well known in the art. These powers and noise floors are then used in the decision process 360 to generate the improved center clipper signal 261. The improved center clipper signal 261 is delayed one state time by the delay function 370. The decision process 360 also uses the delayed value 371 to generate the newest state of the improved center clipper signal 261. It will be appreciated that some of the benefits of the present invention can be realized by using predetermined values for the background noise floor (Bx) 255 of the reference signal 105 and a background noise floor (Bs) 256 of the desired signal 120, or by eliminating the delay function 370.

Figure 4:
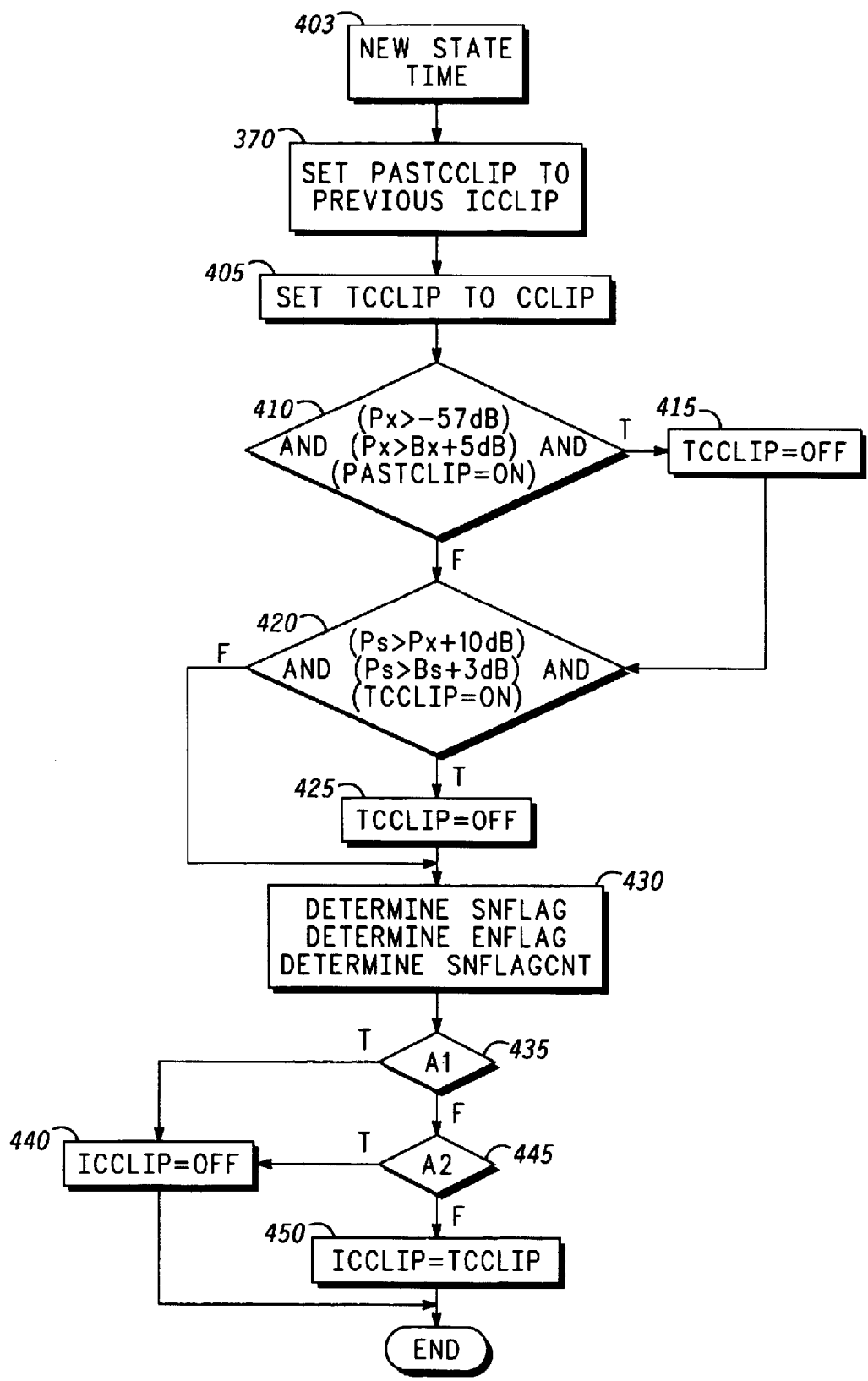
FIG. 4 is a flow chart that shows a decision process used in the center clipper modifier subsystem, in accordance with the preferred embodiment of the present invention.

Referring to FIG. 4, a flow chart of the decision process 360 is shown, in accordance with the preferred embodiment of the present invention. For purposes of this description, the center clipper signal 131 is named CCLIP, the improved center clipper signal 261 is named ICCLIP, an internal, temporary center clipper signal is named, TCCLIP, the previous value of ICCLIP is named PASTCCLIP, and dB is the abbreviation for decibel. At step 403, a new state starts. The delay function 370 (FIG. 3) sets PASTCCLIP 341 (FIG. 3) to the value of ICCLIP 261 (FIGS. 2, 3) that resulted from the previous operation of the decision process 360 (FIG. 3) from the previous state time. Then, TCCLIP is set to CCLIP at step 405. At step 410, when ((Px>−57 dB) AND (Px>Bx+5 dB) AND (PASTCLIP=ON)) is TRUE, TCCLIP is set to ON at step 415 and the process continues at step 420. This decision corresponds to setting the temporary value of the improved center clipper signal to ON when any significant far end signal power occurs in the past near the peak echo delay time. Otherwise, when ((Px>−57 dB) AND (Px>Bx+5 dB) AND (PASTCLIP=ON)) is FALSE at step 410, then the process proceeds directly to step 420, wherein when ((Ps>Px+10 dB) AND (Ps>Bs+3 dB) AND (TCCLIP= ON)) is TRUE at step 425, TCCLIP is set to OFF and the process continues at step 430. This decision corresponds to setting an initial value of the improved center clipper signal to OFF when there is a significant desired signal power that is substantially greater than the far end signal power. Otherwise, when ((Ps>Px+10 dB) AND (Ps>Bs+3 dB) AND (TCCLIP=ON)) is FALSE, then the process proceeds directly to step 430.

At step 430, a flag named SNFLAG is set to TRUE when Ps has been greater than a predetermined power threshold, THSD, for a predetermined quantity, T, of previous state times. Also, at step 430, a flag named ENFLAG is set to TRUE when Pe has been greater than THSD for T consecutive previous state times. Also, at step 430, a flag count named SNFLAGCNT is set to the number of state times within the T previous state times for which Ps has been greater than THSD. In the preferred embodiment of the present invention, THSD is −25 dB (a fairly high power), and the predetermined quantity, T, of previous state times is 4. It will be appreciated, however that the benefits of the present invention can be essentially achieved by using values of THSD and T that vary from those used in this example, when the environment of the telephony system 200 or the hardware used to implement the telephony system 200 is changed.

At step 435, when a condition named A1 is TRUE, ICCLIP is set to OFF at step 440 and the process ends until the next state time, n+1. When condition A1 is FALSE at step 435, then at step 445 when a condition named A2 is TRUE, ICCLIP is set to OFF at step 440 and the process ends until the next state time, n+1. Otherwise, when condition A2 is FALSE at step 445, ICCLIP is set to TCCLIP at step 450 and the process continues at step 405, for the next state time, n+1. It will be appreciated that the conditions A1 and A2 serve to override the setting of TCCLIP to ON at steps 405 or 415.

Condition A1 is TRUE when ((TCCLIP=ON) AND (Pe>THSD) AND (SNFLAG=ON) AND (ENFLAG=ON) AND (Px<−30dB)) is TRUE. This causes a setting of TCCLIP to OFF when the temporary center clipper signal has been set ON, the current power of the error signal is above the fairly high power, the powers of the desired and error signals have been above the fairly high power for the past four state times, and the current power of the far end signal is less than a level that is a few dB lower than the fairly high level.

Condition A2 is TRUE when ((TCCLIP=ON) AND (PASTCCLIP=OFF) AND (SNFLAG=ON) AND (SNFLAGCNT>2) AND (Ps>−30 dB)) is TRUE. This causes a setting of TCCLIP to OFF when the temporary center clipper signal has been set ON, the past improved center clipper signal is OFF, the power of the desired signal has been above the fairly high power for the past T state times, the power of the desired signal has been above the fairly high power for a majority of the past T state times, and the current power of the desired signal is greater than a power that is a few dB lower than the fairly high power.

It will be appreciated that the benefits of the present invention can be essentially achieved by using values of THSD that differ for the different comparisons made in the steps described in this embodiment, when the environment of the telephony system 200 or the hardware used to implement the telephony system 200 changes.

The telephony system 200 and center clipper modifier function 260 are described above as state machines. The state machines are preferably implemented using a digital signal processor (DSP), such as one from the 563xx family of Motorola DSPs that is operated by a unique set of conventional stored program instructions and also using appropriate conventional peripheral logic circuits. But it will be appreciated that alternative embodiments could be used, such as a uniquely designed integrated circuit that has no stored program instructions, or a general purpose microprocessor that is operated by a unique set of conventional stored program instructions and also using appropriate conventional peripheral logic circuits, or some combination of these circuits. It will be further appreciated that the functions, processes, and steps described herein are implemented in the preferred embodiment by subsets of the unique set of conventional programming instructions, but would be implemented by specific sets of logic circuits when implemented as a unique integrated circuit.

Figure 5:
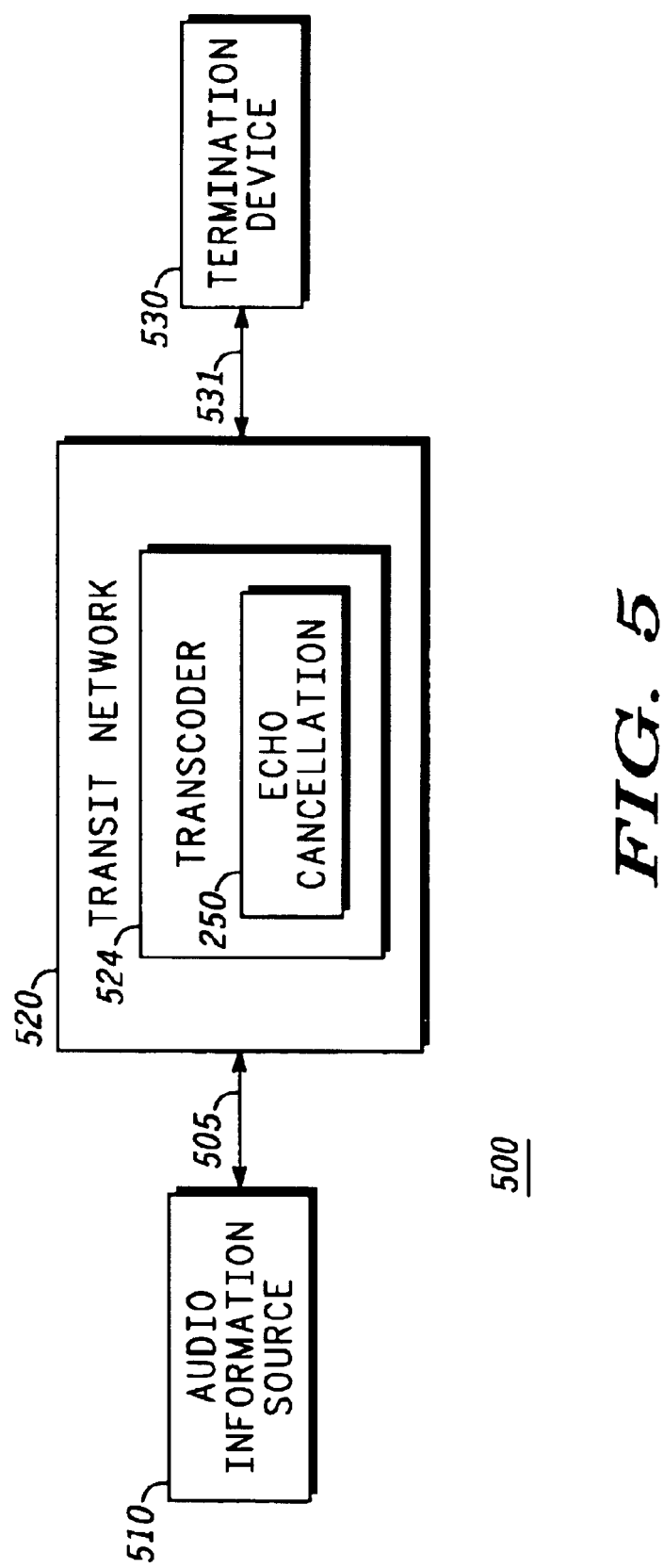
FIG. 5 is a block diagram of a generalized telephone network that uses the echo suppression system of FIG. 2, in accordance with the preferred embodiment of the present invention.

Referring to FIG. 5, a generalized telephone network 500 is shown, in accordance with the preferred embodiment of the present invention. The generalized telephone network 500 comprises an audio information source 510 coupled to an input of a transit network 520, and a termination device 530 coupled to an output of the transit network 520. The audio information source 510 is, for example, a public switched telephone network that couples a reference signal 505 in a conventional mu/a law fornat, or for example, a packet switched network that couples the reference signal 505 in a packet format. The transit network 520 is, for example, a wireless base station controller, or, for example, an internet gateway, which converts the reference signal 505 to audio samples at the preferred sample rate (which is 8 kilosamples per second), generating the equivalent of the reference signal 105 (FIG. 2). The transit network 520 also receives a desired signal 531 which is the equivalent of the desired signal 120 (FIG. 2) from the termination device 530, which comprises the reference signal 505 with added echo and an added near end signal. The termination device 530 is, for example, a mobile wireless telephone, a wireline telephone, or an Internet enabled device. The transit network 520 performs transcoding of the reference signal by means of a transcoder 524, which includes the echo cancellation function 250 described herein, above. It will be appreciated that the echo cancellation function 250 could alternatively be included within the termination device 530. Thus, the transit device 520 substantially removes the effects of echo from the desired signal 120, and generates a suppressed leak through output that is coupled back to the audio information source 510.

It will be appreciated that, in contrast to prior art echo cancellers, the preferred embodiment of the present invention determines the improved center clipper signal 1) using the prior state of the center clipper signal, 2) using spectral matching to the residual echo, 3) using the background noise floors of the reference and desired signals, 4) taking into account the power history of the reference signal, the desired signal, and echo canceller error signal, so as not to mistakenly clip the near-end speech, and 5) using a concentrated power measurement of the reference signal corresponding to the delay of the peak echo sample provided by the echo cancellation adaptive filter. The preferred embodiment of the present invention differentiates between echo and near-end speech, even when the echo power is higher than the reference signal by less than a user defined amount.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

I claim:

1. An echo canceller, comprising:
   a synthetic echo generator that generates a synthetic echo signal and a center clipper signal from a reference signal;
   a difference function that generates an error signal from a desired signal formed from a near end signal that has been added to the reference signal; and
   a center clipper modifier function, coupled to the synthetic echo generator and the difference function, that generates an improved center clipper signal from the center clipper signal, the reference signal, the error signal, and the echo cancelled signal, wherein the center clipper modifier function comprises:

a concentrated reference power function that generates a reference power value that is a measure of the power of the reference signal near the peak echo delay;

a desired signal power function that generates an average desired power value for each state time;

an error signal power function that generates an average error power value for each state time;

a reference signal noise floor estimate function that generates a reference signal noise floor;

a desired signal noise floor estimate function that generates a desired signal noise floor;

a delay function that generates a delayed improved center clipper signal from the improved center clipper signal; and a decision process that generates the improved center clipper signal from the reference power value, the average desired power value, and the average error.

2. The echo canceller according to claim 1, wherein the center clipper modifier function is implemented using a digital signal processor and a set of stored program instructions.

3. The echo canceller according to claim 1, wherein the reference power value selects a maximum power of a predetermined number of average powers of segments of the reference signal near a peak echo delay time.

4. The echo canceller according to claim 1, wherein the decision process comprises a step of setting the improved center clipper signal is ON when any significant far end signal power occurs in the past near the peak echo delay time.

5. The echo canceller according to claim 1, wherein the decision process comprises a step of setting the improved center clipper signal to OFF when there is a significant desired signal power that is substantially greater than the far end signal power.

6. The echo canceller according to claim 1, wherein the decision process comprises a step of setting of the improved center clipper signal to OFF when the current power of the error signal is above a fairly high power, the powers of the desired and error signal have been above the fairly high power for a predetermined number of past state time, and the current power of the far end signal is less than a level that is a few dB lower than the fairly high power.

7. The echo canceller according to claim 6, wherein the fairly high power is −30 dB.

8. The echo canceller according to claim 1, wherein the decision process comprises a step of setting the improved center clipper signal to OFF when the previous improved center clipper signal is OFF and the power of the desired signal has been above a fairly high power for a predetermined number of past state times and the power of the desired signal has been above the fairly high power for a majority of the predetermined number of past state time, and the current power of the desired signal is greater than a power that is a few dB lower than the fairly high power.

9. The echo canceller according to claim 6, wherein the fairly high power is −30 dB.

10. A transit network that comprises the echo canceller according to claim 1.

11. A termination device that comprises the echo canceller according to claim 1.

12. The echo canceller according to claim 1, wherein the clipper signal is essentially determined from values generated only by an adaptive filter having the reference signal as an input.

13. A method for echo cancellation, comprising the steps of:

generating a synthetic echo signal and a center clipper signal from a reference signal;

generating an error signal from a desired signal that has been added to a negative of a synthetically generated echo signal; and generating an improved center clipper signal from the center clipper signal, the reference signal, the error signal, and the echo cancelled signal, wherein generating an improved center clipper signal comprises:

generating a reference power value that is a measure of the power of the reference signal near the peak echo delay;

generating an average desired power value for each state time;

generating an average error power value for each state time; and generating the improved center clipper signal each state time from the reference power value, the average desired power value, and the average error power value.

14. The method of echo cancellation according to claim 13, further comprising the step of generating the desired signal by adding a near end signal to the reference signal as modified by a system echo.

15. The method of echo cancellation according to claim 13, wherein the step of generating an improved center clipper signal each state time further comprises the steps of:

generating a reference signal noise floor; and generating a desired signal noise floor;

and wherein the step of generating the improved center clipper signal includes generating the improved center clipper signal from the reference signal noise floor and the desired signal noise floor.

16. A method of echo cancellation comprising the steps of:

generating a synthetic echo signal and a center clipper signal from a reference signal;

generating a desired signal by adding a near end signal to the reference signal as modified by a system echo;

generating an error signal from the desired signal that has been added to a negative of a synthetically generated echo signal; and generating an improved center clipper signal from the center clipper signal, the reference signal, the error signal, and the echo cancelled signal, and generating a delayed improved center clipper signal from the improved center clipper signal, wherein the step of generating the improved center clipper signal includes generating the improved center clipper signal from the delayed improved center clipper signal.

* * * * *